(12) United States Patent
Tanaka et al.

(10) Patent No.: US 12,180,119 B2
(45) Date of Patent: Dec. 31, 2024

(54) TRANSPARENT CERAMICS, MANUFACTURING METHOD THEREOF, AND MAGNETO-OPTICAL DEVICE

(71) Applicant: Shin-Etsu Chemical Co., Ltd., Tokyo (JP)

(72) Inventors: Keita Tanaka, Annaka (JP); Shinji Aoki, Annaka (JP); Shinji Makikawa, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 1004 days.

(21) Appl. No.: 17/091,486

(22) Filed: Nov. 6, 2020

(65) Prior Publication Data

US 2021/0053880 A1 Feb. 25, 2021

Related U.S. Application Data

(62) Division of application No. 16/292,928, filed on Mar. 5, 2019, now Pat. No. 10,858,294.

(30) Foreign Application Priority Data

Mar. 9, 2018 (JP) .................................. 2018-043076

(51) Int. Cl.
*C04B 35/50* (2006.01)
*C01F 17/32* (2020.01)
(Continued)

(52) U.S. Cl.
CPC ............ *C04B 35/505* (2013.01); *C01F 17/32* (2020.01); *C04B 35/50* (2013.01);
(Continued)

(58) Field of Classification Search
CPC ....... C04B 35/50; C04B 35/63; C04B 35/505; C04B 35/645; C04B 35/6264;
(Continued)

(56) References Cited

U.S. PATENT DOCUMENTS

| 9,470,915 B2 | 10/2016 | Makikawa et al. |
| 2014/0002900 A1* | 1/2014 | Makikawa ............ G02F 1/0036 252/583 |
| 2017/0205643 A1* | 7/2017 | Makikawa ............... C04B 35/50 |

FOREIGN PATENT DOCUMENTS

| EP | 2687500 A1 | 1/2014 |
| JP | 2008-143726 A | 6/2008 |

(Continued)

OTHER PUBLICATIONS

Apetz et al., "Transparent Alumina: A Light-Scattering Model", Journal of the American Ceramic Society, 2003, vol. 86 No. 3 pp. 480-486, cited in Specification (7 pages).

(Continued)

*Primary Examiner* — Bijan Ahvazi
(74) *Attorney, Agent, or Firm* — WHDA, LLP (57) ABSTRACT

A transparent ceramic material is manufactured by molding a source powder into a compact, the source powder comprising a rare earth oxide consisting of at least 40 mol % of terbium oxide and the balance of another rare earth oxide, and a sintering aid, sintering the compact at a temperature T (1,300° C.≤T≤1,650° C.) by heating from room temperature to T1 (1200° C.≤T1≤T) at a rate of at least 100° C./h, and optionally heating from T1 at a rate of 1-95° C./h, and HIP treating the sintered compact at 1,300-1,650° C. The ceramic material has improved diffuse transmittance in the visible region and functions as a magneto-optical part in a broad visible to NIR region.

6 Claims, 2 Drawing Sheets

(51) Int. Cl.
C04B 35/505 (2006.01)
C04B 35/626 (2006.01)
C04B 35/63 (2006.01)
C04B 35/64 (2006.01)
C04B 35/645 (2006.01)
G02B 1/02 (2006.01)
G02F 1/00 (2006.01)
G02F 1/09 (2006.01)

(52) U.S. Cl.
CPC ...... *C04B 35/6264* (2013.01); *C04B 35/6265* (2013.01); *C04B 35/6268* (2013.01); *C04B 35/62685* (2013.01); *C04B 35/6303* (2013.01); *C04B 35/64* (2013.01); *C04B 35/645* (2013.01); *C04B 35/6455* (2013.01); *G02B 1/02* (2013.01); *G02F 1/0036* (2013.01); C04B 2235/3205 (2013.01); C04B 2235/3206 (2013.01); C04B 2235/3208 (2013.01); C04B 2235/3213 (2013.01); C04B 2235/3215 (2013.01); C04B 2235/3224 (2013.01); C04B 2235/3225 (2013.01); C04B 2235/3232 (2013.01); C04B 2235/3244 (2013.01); C04B 2235/3852 (2013.01); C04B 2235/60 (2013.01); C04B 2235/602 (2013.01); C04B 2235/604 (2013.01); C04B 2235/6562 (2013.01); C04B 2235/658 (2013.01); C04B 2235/6581 (2013.01); C04B 2235/6583 (2013.01); C04B 2235/661 (2013.01); C04B 2235/662 (2013.01); C04B 2235/663 (2013.01); *C04B 2235/664* (2013.01); *C04B 2235/762* (2013.01); *C04B 2235/9653* (2013.01); *G02F 1/093* (2013.01)

(58) Field of Classification Search
CPC ............ C04B 35/6265; C04B 35/6268; C04B 35/6303; C04B 35/6455; C04B 35/62685; C04B 2235/602; C04B 2235/661; C04B 2235/3225; C04B 2235/3244; G02F 1/0036; G02F 1/093; G02B 1/02; C01F 17/32
See application file for complete search history.

(56) References Cited

FOREIGN PATENT DOCUMENTS

| | | |
|---|---|---|
| JP | 4878343 B2 | 2/2012 |
| JP | 5704097 B2 | 4/2015 |
| JP | 2016-169115 A | 9/2016 |
| WO | 2015/186656 A1 | 12/2015 |

OTHER PUBLICATIONS

Wurst et al., "Lineal Intercept Technique for Measuring Grain Size in Two-Phase Polycrystalline Ceramics", Journal of the American Ceramic Society—Discussion and Notes, Feb. 1972, pp. 109, cited in Specification (1 page).

* cited by examiner

TRANSPARENT CERAMICS, MANUFACTURING METHOD THEREOF, AND MAGNETO-OPTICAL DEVICE

CROSS-REFERENCE TO RELATED APPLICATION

This application claims divisional status from U.S. Ser. No. 16/292,928 filed Mar. 5, 2019, which in turn claims priority to Patent Application No. 2018-043076 filed in Japan on Mar. 9, 2018. The entirety of each of these related applications is hereby incorporated by reference.

TECHNICAL FIELD

This invention relates to a method for manufacturing a transparent ceramic material in the form of a Tb-based complex oxide sintered body having a high transparency or light transmittance in the visible to near-infrared (NIR) region, a transparent ceramic material manufactured thereby, and a magneto-optical device.

BACKGROUND ART

There have been developed and manufactured a wide variety of ceramics covering from traditional ceramics such as tiles and potteries to fine ceramics such as piezoelectric parts, superconductor parts and transparent ceramics.

Transparent ceramics draw attention as a new replacement to single crystals since laser oscillation by ceramics was reported in 1990s. Transparent ceramics are used in magneto-optical parts, scintillator materials, high-strength window members and the like, enable the composition design and size enlargement which are impossible with single crystals, and are regarded advantageous in manufacture cost over single crystals.

The magneto-optical part which is one of major applications of transparent ceramics refers to a material having a Faraday effect of polarizing light by applying a magnetic field across the part, and is used, for example, in optical communications and fiber laser devices. The use of the magneto-optical part as a Faraday rotator is effective for restraining the return light occurring at the end surface of a fiber, contributing to the stabilization of laser output. For example, garnet-type $Tb_3Ga_5O_{12}$ (Patent Document 1: JP 4878343), C-type (cubic) rare earth-based $(Tb_xRe_{1-x})_2O_3$ (Patent Documents 2, 3: JP 5704097, WO 2015/186656), pyrochlore-type $Tb_2Hf_2O_7$ (Patent Document 4: JP-A 2016-169115) and the like are currently produced as ceramic magneto-optical parts. Inter alia, the C-type rare earth-based oxide is a material worth expecting because it can contain much terbium ions having a great Faraday effect and thus contributes to a length reduction of magneto-optical parts.

Among the physical properties required for transparent ceramics used as optical materials as well as magneto-optical parts, it is most important to acquire a high transparency comparable to single crystals. The cause for exacerbating transparency is generally divided into two factors. One factor is the light absorption of the material itself, for example, the material may be colored due to impurities and crystal defects. The light absorption can be reduced by controlling impurities and optimizing preparation conditions. The other factor is light scattering, that is, incident light is scattered in every direction, for example, exacerbating laser quality. The cause for light scattering includes the following three types: (1) precipitation of a heterophase different from the major phase of the material (phase of main composition), (2) bubbles left behind within the material, and (3) grain boundary scattering occurring at the boundary between crystal grains. Every scattering factor can be reduced by optimizing the heat treatment step at a high temperature of at least 1,300° C., known as sintering step.

Among these, the grain boundary scattering is caused by a minute difference in refractive index between crystal grains and referred to as Rayleigh-Gans-Debye scattering (RGD scattering) dependent on the reciprocal of the square of wavelength. Non-Patent Document 1 (J. Am. Ceram. Soc., 86, 480 (2003)) pays attention to the size of crystal grains in controlling the RGD scattering for the purpose of improving the transparency of hexagonal alumina transparent ceramic. Hexagonal alumina has a refractive index which is different by 0.008 at maximum depending on crystal orientation, the difference of refractive index due to orientation becomes the cause of RGD scattering. Since the RGD scattering depends on not only the difference of refractive index, but also the grain size, the RGD scattering decreases as the grain size becomes smaller. It is demonstrated that when an attempt is made to transparentize hexagonal alumina ceramic by setting the preparation conditions such that the hexagonal alumina ceramic may have different grain size, an alumina ceramic having a high degree of transparency is synthesized as long as the grain size is up to 1 μm.

For the cubic structure which is common to transparent ceramics, it is unlikely that the difference of refractive index between grains becomes large. In the cubic structure, unlike the hexagonal structure, the refractive index does not depend on crystal orientation. It is then believed that transparent ceramics composed solely of the main component cause less RGD scattering.

However, of actual transparent ceramics, few ceramics are composed solely of the main component, because additives such as sintering aid are mostly added. If the sintering aid and the main component oxide are not uniformly mixed, a compositional variation occurs among grains, eventually bringing a difference of refractive index between grains to induce RGD scattering. Particularly when the difference in ionic radius between elements of the main component and the sintering aid exceeds 15%, it is difficult to uniformly mix the main component and the sintering aid. In order to avoid this phenomenon, Patent Document 5 (JP-A 2008-143726) sets the size of crystal grains to range from 5 μm to 300 μm, for thereby achieving a consistent intragranular composition with as large crystal grains as possible. However, since the RGD scattering due to a difference of refractive index between grains is also affected by grain size, it is not concluded that better results are always obtainable from large crystal grains.

Patent Documents 2 and 3 disclose that C-type rare earth-based transparent ceramics are used in magneto-optical parts. In Patent Document 2, a transparent ceramic having a transmittance of about 70% in the NIR region is prepared by adding an oxide of Group 4 element or Group 2 element to a source powder as sintering aid in an amount of 0.5% by weight based on the source powder, mixing and grinding. Because of the non-uniform distribution of the sintering aid, it is difficult to obtain a high transmittance of at least 80%. Addressing the problem, Patent Document 3 discloses that a transparent ceramic having an insertion loss of up to 0.97 dB at 1,064 nm, i.e., a linear transmittance of at least 80.3% is obtained by simultaneous co-precipitation of a sintering aid during synthesis of a source powder, for thereby achieving uniform distribution of the sintering aid.

Although a high linear transmittance is available in Patent Document 3, the diffuse transmittance (of light emerging from the emergent surface of an optical part, the quantity of light scattered in directions other than a perpendicular direction to the emergent surface, to be described later in detail) at wavelength 1,064 nm is, in most cases, 0.6% to 0.9%. The presumed reason is that since the temperature of HIP treatment in Patent Document 3 is as high as 1,800° C., the resulting transparent ceramic is composed of crystals with a grain size of about 5 μm, and as a result, RGD scattering is increased. When the wavelength dependence of diffuse transmittance is confirmed in practice, it is found that a component depending on the reciprocal of the square of wavelength, that is, RGD scattering accounts for about 90% of the overall diffuse transmittance. When the scattering transmittance is 0.6% to 0.9% at wavelength 1,064 nm, the material is at a practically acceptable level as magneto-optical parts in the NIR region. When wavelength 532 nm which is half of wavelength 1,064 nm is considered, because of dependence on the reciprocal of the square of wavelength, the scattering transmittance at wavelength 532 nm is 2.4% to 3.6%, which is 4 times the scattering transmittance at wavelength 1,064 nm. Then the ceramic is difficult to use as magneto-optical parts for light of wavelength 532 nm. Namely, further reduction of scattering is necessary for C-type rare earth-based magneto-optical parts to function over a wide wavelength range from visible to NIR region.

CITATION LIST

Patent Document 1: JP 4878343
Patent Document 2: JP 5704097 (U.S. Pat. No. 9,470,915, EP 2687500)
Patent Document 3: WO 2015/186656
Patent Document 4: JP-A 2016-169115
Patent Document 5: JP-A 2008-143726
Non-Patent Document 1: J. Am. Ceram. Soc., 86, 480 (2003)
Non-Patent Document 2: J. Am. Ceram. Soc., Discussions and Notes, 1972, February 109

SUMMARY OF INVENTION

An object of the invention is to provide a method for manufacturing a transparent ceramic material in the form of a Tb-based complex oxide sintered body having improved diffuse transmittance in the visible region and functioning as a magneto-optical part in a wide wavelength range from visible to NIR region; a transparent ceramic material manufactured thereby; and a magneto-optical device.

In one aspect, the invention provides a method for manufacturing a transparent ceramic material, comprising the steps of:

molding a source powder into a compact, the source powder comprising a rare earth oxide consisting of terbium oxide and at least one other rare earth oxide selected from yttrium oxide, scandium oxide, and oxides of lanthanoid elements (exclusive of terbium), in a molar fraction of at least 40 mol % terbium oxide and the balance of the other rare earth oxide as a main component, and an oxide of at least one element selected from Group 2 elements and Group 4 elements as a sintering aid, sintering the compact at a sintering temperature T wherein $1,300°\,C. \leq T \leq 1,650°\,C.$, the sintering step including heating from room temperature to a predetermined temperature T1 wherein $1200°\,C. \leq T1 \leq T$ at a heating rate of at least 100° C./h, and optionally heating from the temperature T1 at a rate of from 1° C./h to 95° C./h, hot isostatic pressing (HIP) the sintered compact at 1,300° C. to 1,650° C., thereby forming the transparent ceramic material in the form of a complex oxide sintered body represented by the formula (I):

$$(Tb_xR_{1-x})_2O_3 \quad (I)$$

wherein x is a number: $0.4 \leq x < 1.0$, and R is at least one other rare earth element selected from yttrium, scandium, and lanthanoid rare earth elements (exclusive of terbium), the sintered body having a crystal grain size of from 0.5 μm to 2 μm, wherein a specimen of 11 mm long made from the sintered body has an overall light transmittance of at least 80.0% and a diffuse transmittance of up to 1.6% at wavelength 633 nm.

In a preferred embodiment, the source powder is obtained by furnishing an aqueous solution containing (a) terbium ions, (b) ions of at least one rare earth element selected from yttrium, scandium, and lanthanoid elements (exclusive of terbium), and (c) ions of at least one element selected from Group 2 elements and Group 4 elements, letting components (a), (b) and (c) co-precipitate from the solution, filtering and heat drying the co-precipitate.

Typically, the sintering aid is zirconium oxide and/or hafnium oxide. Preferably, the sintering aid is added in an amount of 0.1% to 3% by weight.

Preferably, the other rare earth oxide is yttrium oxide.

Preferably, the predetermined temperature T1 is up to 1,400° C.

In a preferred embodiment, the heating rate in the sintering step from room temperature to the predetermined temperature T1 is up to 300° C./h.

In another aspect, the invention provides a transparent ceramic material in the form of a complex oxide sintered body represented by the formula (I):

$$(Tb_xR_{1-x})_2O_3 \quad (I)$$

wherein x is a number: $0.4 \leq x < 1.0$, and R is at least one rare earth element selected from yttrium, scandium, and lanthanoid elements (exclusive of terbium), the sintered body having a crystal grain size of from 0.5 μm to 2 μm, wherein a specimen of 11 mm long made from the sintered body has an overall light transmittance of at least 80.0% and a diffuse transmittance of up to 1.6% at wavelength 633 nm.

In a preferred embodiment, the specimen of 11 mm long has an overall light transmittance of at least 80.2% and a diffuse transmittance of up to 0.7% at wavelength 1,064 nm.

In a further aspect, the invention provides a magneto-optical device comprising a magneto-optical part using the transparent ceramic material defined herein.

ADVANTAGEOUS EFFECTS OF INVENTION

The method for manufacturing a transparent ceramic material in the form of a cubic (C type) rare earth complex oxide sintered body includes the sintering step and the HIP step, wherein the heating rate up to the predetermined temperature T1 in the sintering step is high while the sintering temperature T is kept relatively low, and the HIP temperature of the HIP step is kept relatively low. A sintered body containing crystal grains with a grain size of up to 2 μm and having a density of at least 95% is obtained, thereby reducing RGD scattering due to a compositional variation among crystal grains. The transparent ceramic material functions as an optical part in a broad range from visible to NIR.

DESCRIPTION OF PREFERRED EMBODIMENTS

Method for Manufacturing Transparent Ceramic Material

One embodiment of the invention is a method for manufacturing a transparent ceramic material, comprising the steps of:

molding a source powder into a compact, the source powder comprising a rare earth oxide consisting of terbium oxide and at least one other rare earth oxide selected from yttrium oxide, scandium oxide, and oxides of lanthanoid elements (exclusive of terbium), in a molar fraction of at least 40 mol % terbium oxide and the balance of the other rare earth oxide as a main component, and an oxide of at least one element selected from Group 2 elements and Group 4 elements as a sintering aid, sintering the compact at a sintering temperature T (1,300° C.≤T≤1,650° C.), the sintering step including heating from room temperature to a predetermined temperature T1 (1200° C.≤T1≤T) at a heating rate of at least 100° C./h, and optionally heating from the temperature T1 at a heating rate of from 1° C./h to 95° C./h, hot isostatic pressing (HIP) the sintered compact at 1,300° C. to 1,650° C., thereby forming the transparent ceramic material in the form of a complex oxide sintered body represented by the formula (I):

$(Tb_xR_{1-x})_2O_3$      (I)

wherein x is a number: 0.4≤x<1.0, and R is at least one other rare earth element selected from yttrium, scandium, and lanthanoid rare earth elements (exclusive of terbium). The sintered body has a crystal grain size of from 0.5 μm to 2 μm. A specimen of 11 mm long made from the sintered body has an overall light transmittance of at least 80.0% and a diffuse transmittance of up to 1.6% at wavelength 633 nm.

Method

The method generally involves furnishing particles of preselected metal oxides as the source powder (starting raw material), press molding the source powder into a compact of predetermined shape, effecting binder burnout, sintering the compact for consolidation to a relative density of at least 95%, and hot isostatic pressing (HIP) the sintered body. This may be followed by post-treatment such as annealing.

Source Powder

As the source powder with which the inventive method starts, particles of any metal oxides which form a sintered body of Tb-based complex oxide which exhibits light transmission are advantageously used. The raw materials may be selected in accordance with a particular method for preparing the source powder, from rare earth metal powders containing terbium (Tb) and at least one rare earth metal selected from yttrium (Y), scandium (Sc), and lanthanoid elements (exclusive of terbium), aqueous solutions thereof in nitric acid, hydrochloric acid, and sulfuric acid, and nitrates, halides and sulfides containing terbium (Tb) and at least one rare earth element selected from yttrium (Y), scandium (Sc), and lanthanoid elements (exclusive of terbium). The raw materials may have a purity of market level (at least 3N, at least 99.9% by weight), preferably at least 4N (99.99% by weight), more preferably at least 5N (99.999% by weight).

While a transparent ceramic material in the form of a Tb-based complex oxide sintered body is finally manufactured using oxide powders in the desired mixing ratio as the source powder, the oxide powders used herein preferably have a primary particle size of up to 1,000 nm, more preferably up to 300 nm. If the primary particle size exceeds 1,000 nm, the powder is less sinterable and sintering treatment must be performed at higher temperature, imposing severer restrictions to the preparation cost and apparatus. Also, if primary particles are large, greater gaps are defined among primary particles during molding, with the likelihood of voids being left. The method of preparing a power having such a primary particle size includes bottom-up synthesis methods such as co-precipitation, uniform precipitation and hydrothermal reaction, and top-down synthesis methods such as mechanical treatment, typically ball milling of coarse powder of about 100 μm, to pulverize particles to a desired primary particle size. In the practice of the invention, a raw material synthesized by the bottom-up method is preferably used. Primary particles are preferably of spherical or plate shape, but not limited thereto as long as transparentizing is possible.

The source powder used herein may further contain a sintering aid composed of an oxide of at least one element selected from Group 2 elements, Group 4 elements, Group 13 elements and Group 14 elements. The source powder preferably contains a sintering aid composed of an oxide of Group 4 element, most preferably Zr oxide and/or Hf oxide. While the sintering aid has an impact on the subsequent sintering step, the type and amount of the sintering aid may be optimized for transparentization. The amount of the sintering aid is preferably from 0.1% to 3% by weight, more preferably from 0.5% to 3% by weight, calculated as oxide of the sintering aid, based on the total weight of rare earth complex oxide (main component). Less than 0.1% by weight of the sintering aid may fail to exert its effect whereas more than 3% by weight has the risk of the sintering aid precipitating out to become a scattering factor. The sintering aid should preferably have a purity of at least 99.9% by weight. Most preferably, the sintering aid is added as ions during the bottom-up synthesis of the source powder, in order to make the composition uniform.

Also, in the source powder, any component other than the main component (oxides to form Tb-based complex oxide) and sintering aid should preferably be controlled to or below 10 ppm.

Preferably the source powder is prepared by the three-component co-precipitation process to be described below.

Three-Component Co-Precipitation Process

The source powder is typically prepared by furnishing an aqueous solution containing (a) terbium ions, (b) ions of at least one other rare earth element selected from yttrium, scandium, and lanthanoid elements (exclusive of terbium), which is substantially non-absorptive at wavelength 1.064 μm, and (c) ions of at least one element selected from Group 2 elements and Group 4 elements, for example, titanium, zirconium, hafnium, calcium and magnesium ions, which forms an oxide serving as the sintering aid for preventing precipitation of a heterophase other than cubic crystals in the crystal structure of terbium oxide-based complex oxide ceramic material, and letting components (a), (b) and (c) co-precipitate from the solution through the co-precipitation process. The resulting source powder (i.e., rare earth oxide powder to be sintered) contains a rare earth oxide consisting essentially of terbium oxide and at least one other rare earth oxide selected from yttrium oxide, scandium oxide, and oxides of lanthanoid elements (exclusive of terbium), in a molar fraction of at least 40 mol % of terbium oxide and the balance of other rare earth oxide, and the sintering aid consisting of the oxide of at least one element selected from Group 2 and Group 4 elements. This process is designated herein as three-component co-precipitation process.

As a typical three-component co-precipitation process, the oxide source powder may be prepared by dissolving the predetermined raw materials so that components (a), (b) and (c) are contained in an acidic aqueous solution, for example, 5N nitric acid aqueous solution, adding an alkaline aqueous solution, for example, ammonia to the aqueous solution, letting components (a), (b) and (c) co-precipitate as hydroxide, filtering the precipitate, and heat drying the hydroxide at a temperature of at least 500° C. The precipitate-inducing means is not limited to the addition of an alkaline aqueous solution, and any desired precipitation means may be used as long as no disproportionation occurs during formation of co-precipitate of components (a), (b) and (c). For example, the method of adding oxalic acid to an acidic aqueous solution having components (a), (b) and (c) dissolved therein and letting the oxalate precipitate, or the method of adding a salt containing carbonate ions such as ammonium hydrogencarbonate or ammonium carbonate and letting the carbonate precipitate may be advantageously utilized. Further, the preferred treatment to obtain a powder of stable particle shape is, for example, by adding dropwise an alkaline aqueous solution such as aqueous ammonia to an acidic aqueous solution containing ions of three components, to form hydroxide, adding dropwise an aqueous solution of a carbonate ion-containing salt such as an ammonium hydrogencarbonate aqueous solution thereto, thereby once converting the hydroxide to carbonate, aging the solution, and thereafter, adding dropwise aqueous ammonia again for re-converting to hydroxide. With this treatment, the particles precipitate in stable particle shape without agglomeration.

The raw material for component (a) is preferably terbium oxide ($Tb_2O_3$) powder having a purity of preferably at least 99% by weight, more preferably at least 99.9% by weight or $Tb_4O_7$ powder having an equivalent purity. Alternatively, a powder of another compound such as fluoride or nitride of terbium may be used as long as the compound is dissolved in an acidic aqueous solution to form terbium ions, but not complex ions. Of these, terbium oxide powder is more preferred because impurity ions can have an impact on reaction or firing.

The raw material for component (b) is preferably at least one rare earth oxide powder selected from yttrium, scandium, and lanthanoid elements (exclusive of terbium), having a purity of preferably at least 99% by weight, more preferably at least 99.9% by weight. Alternatively, a powder of another compound such as fluoride or nitride of the rare earth element may be used as long as the compound is dissolved in an acidic aqueous solution to form rare earth ions, but not complex ions. Of these, yttrium oxide, scandium oxide or lanthanoid oxide powder is more preferred because impurity ions can have an impact on reaction or firing.

The raw material for component (c) is preferably a powder of oxide of at least one element selected from Group 2 and Group 4 elements, having a purity of preferably at least 99% by weight, more preferably at least 99.9% by weight.

These raw materials are weighed in amounts corresponding to the composition of the transparent complex oxide sintered body finally obtained therefrom, and dissolved in an acidic aqueous solution. Specifically, first the raw material for component (a) and the raw material for component (b) are weighed in such amounts as to give the predetermined molar ratio as rare earth oxides. Subsequently, the raw material for component (c) is weighed in such an amount as to give the predetermined content of its oxide relative to the total weight of rare earth oxides. Notably, when all the raw materials for components (a), (b) and (c) are oxides and completely dissolve in an acidic aqueous solution, the ratio of the amounts of the raw materials as weighed corresponds directly to the weight ratio (in parts by weight) in the source powder obtained from the three-component co-precipitation process.

In dissolving the raw materials for components (a), (b) and (c) as weighed, the raw materials may be mixed together and the powder mixture be dissolved in an acidic aqueous solution, or the raw materials may be dissolved in an acidic aqueous solution in sequence.

The acidic aqueous solution used herein is not particularly limited as long as the raw materials for components (a), (b) and (c) are dissolvable therein without forming complex ions so that the solution may contain ions of components (a), (b) and (c). Examples include 5N nitric acid aqueous solution, sulfuric acid aqueous solution, and hydrochloric acid aqueous solution. An acidic aqueous solution which dissolves all the raw materials for three components completely is preferred, with nitric acid solution being more preferred. The nitric acid solution has the additional advantage that the amount of inorganic salts left after firing is small.

A precipitant may be added to the acidic aqueous solution containing ions of three components whereby all ions of three components co-precipitate. The precipitant is not particularly limited as long as it may be removed from the co-precipitate by water washing and filtration. Suitable precipitants include aqueous ammonia ($NH_4OH$), oxalic acid (($COOH)_2$), ammonium hydrogencarbonate ($NH_4HCO_3$), and ammonium carbonate (($NH_4)_2CO_3$). Of these, aqueous ammonia is most preferred because impurity ions are minimized.

The oxide raw material obtained by the above procedure is a source powder which contains a rare earth oxide consisting essentially of (A) terbium oxide and (B) at least one other rare earth oxide selected from yttrium oxide, scandium oxide and lanthanoid oxides (exclusive of terbium oxide), which is substantially non-absorptive at wavelength 1.064 μm, in a molar fraction of at least 40 mol % of terbium oxide and the balance of other rare earth oxide, and (C) the sintering aid consisting of the oxide of at least one element selected from Group 2 and Group 4 elements. The other rare earth oxide is preferably yttrium oxide.

The source powder itself is not significantly different from conventional powder in physical properties such as particle shape and orientation, but characterized in that sintering reaction takes place uniformly at a microscopic level.

The source powder thus prepared has a purity of preferably at least 99% by weight, and for use in the optical application, a purity of more preferably at least 99.9% by weight, even more preferably at least 99.99% by weight.

Provided that the sum of (A) terbium oxide and (B) other rare earth oxide is a molar ratio of 1 (100 mol %), the rare earth oxide consists of at least 40 mol %, preferably from 40 mol % to 90 mol % of (A) terbium oxide and the balance of (B) other rare earth oxide. Preferably the oxide source powder consists essentially of component (A), component (B) and component (C) or sintering aid.

A source powder based on (or composed mainly of) components (A) and (B) means that the total of oxides or components (A) and (B) is at least 90% by weight of the source powder. The total content of oxides or components (A) and (B) is preferably at least 95% by weight, more preferably at least 97% by weight.

Component (C) or sintering aid is an oxide of at least one element selected from Group 2 and Group 4 elements.

The sintering aid is preferably a compound which prevents precipitation of a heterophase other than cubic crystals in the crystal structure of terbium oxide-based complex oxide sintered body. Suitable sintering aids include oxides of Group 4 elements such as titanium, zirconium and hafnium, and oxides of Group 2 elements such as magnesium and calcium. A mixture of Group 4 element oxide and Group 2 element oxide is also acceptable. Since these oxides are not absorptive around wavelength 1.06 μm, they are suited for use in the transparent complex oxide sintered body of the invention. While the Group 4 element oxide is known as a stabilizer in the sintering of yttria, it is also effective as a stabilizer for the transparent complex oxide sintered body of the invention. It is noted that Group 2 elements such as magnesium and calcium have a high reaction activity because of strong ionic character so that they are readily incorporated in rare earth oxides as solid solution. Thus zirconium oxide and hafnium oxide are preferred as the sintering aid.

To the source powder, component (C) or sintering aid which prevents precipitation of a heterophase other than cubic crystals in the crystal structure of terbium oxide-based complex oxide sintered body, for example, oxide of Group 4 element such as titanium, zirconium or hafnium or oxide of Group 2 element such as magnesium or calcium is preferably added in an amount of from 0.1% by weight to 3% by weight, more preferably from 0.5% by weight to 3% by weight, based on the total weight of the rare earth complex oxide (or main component). Outside the range, the resulting transparent complex oxide sintered body may fail to meet one or more of the characteristics required as the magneto-optical device material. For example, when a specimen of 11 mm thick is made from the sintered body, the insertion loss at wavelength 1,064 nm inclusive of reflection loss at an end surface in thickness direction exceeds 0.99 dB.

It is noted that the Group 4 element oxide may be used alone or the Group 2 element oxide may be used alone, or the Group 4 element oxide and the Group 2 element oxide may be simultaneously used as the sintering aid. Since the Group 4 element forms a tetravalent ion and the Group 2 element forms a divalent ion, they are simultaneously added so that the rare earth oxide is doped in the form to compensate for the valence of total ions, or so-called charge compensation form, whereby ionic defects are minimized.

The source powder used herein should preferably have a primary particle size of 100 to 1,000 nm, more preferably 100 to 300 nm. If the primary particle size is less than 100 nm, such powder is difficult to handle, for example, difficult to mold, and a compact, if molded, has a low density and is susceptible to cracking because of a substantial shrinkage factor upon sintering. If the primary particle size exceeds 1,000 nm, such powder is less sinterable and thus difficult to produce a transparent sintered body having a high density. The primary particle size is determined as an average of lengths of 100 primary particles in an arbitrary field of view when observed under a scanning electron microscope or optical microscope.

Slurry Formation

For the purpose of facilitating handling and molding in the subsequent molding step, the source powder is preferably converted to a slurry. The solvent used in the slurry may be selected from water and organic solvents such as ethanol, and is not particularly limited as long as slurry dispersion is not adversely affected. An organic additive such as dispersant or binder may be added to the slurry to improve dispersion stability.

The amount of the organic additive added is preferably up to 5% by weight and more preferably a minimum amount above which the desired physical properties are obtainable. Also preferably, the slurry has a solid concentration of from 10% to 50% by weight. If the concentration is less than 10% by weight, the slurry concentration is so low that the amount of the slurry for treatment may be inevitably increased, raising a problem in productivity. If the concentration is more than 50% by weight, agglomeration may occur in the slurry, and the slurry may have a high viscosity and become difficult to handle. The treatment for forming a slurry may be ball mill mixing, ultrasonic dispersion, jet mill, homogenizer or other treatment, and not particularly limited as long as slurry formation is possible.

Molding

The source powder prepared as above is then molded. The molding step is generally divided into dry molding and wet molding and not particularly limited as long as a compact can be transparentized, with the dry molding method being preferred from the aspect of productivity. The dry molding method involves removing the solvent from the slurry prepared in the previous step, forming granules, and pressing the granules under pressure by uniaxial pressing or cold isostatic pressing (CIP) into a compact of predetermined size.

The step of removing the solvent from the slurry may be spray drying, vacuum drying or the like, and not particularly limited as long as granules with a particle size of 50 to 500 μm are obtainable. If the granule size is less than 50 μm, handling may be difficult and molding be poor. If the granule size is more than 500 μm, it may be difficult to collapse gaps defined between granules during molding. Although the pressure of uniaxial pressing or CIP is not particularly limited, the pressing pressure may be set so as to achieve a relative density of at least 50% of the true density of the material.

The resulting compact is heat treated at a temperature of from 250° C. to 800° C. to remove the organic additive added in the slurry forming step. If the heating temperature is lower than 250° C., there is the risk of insufficient removal of the organic additive. If the heating temperature exceeds 800° C., there is the possibility of cracking or other failure. The removal of the organic additive is preferably confirmed by thermal analysis such as thermogravimetric/differential thermal analysis (TG/DTA).

According to the invention, the compact as prepared above is sintered and hot isostatic pressing (HIP) treated, yielding a transparent complex oxide sintered body (transparent ceramic material).

Sintering

In the manufacturing method of the invention, a heat sintering step of resistance heating or induction heating mode may be advantageously utilized. The atmosphere is selected from vacuum (reduced pressure), a reducing atmosphere such as hydrogen, and an oxidizing atmosphere such as oxygen or air, and not particularly limited as long as the desired relative density is reached. In the case of resistance heating, sintering may be performed within an oxide container in order to avoid contamination with impurities from the heater. The material of the container is typically selected from alumina, yttria, zirconia and the like, but not particularly limited In the sintering step of the manufacturing method of the invention wherein the compact prepared as above is sintered by heating at a sintering temperature T wherein 1,300° C.≤T≤1,650° C., heating from room temperature (e.g., from 1° C. to 40° C.) to a predetermined temperature T1 wherein 1200° C.≤T1≤T is at a heating rate of at least 100° C./h, and in the case of further heating from the temperature T1 (i.e., T1<T), this heating is at a rate of from 1° C./h to 95° C./h, completing the sintering treatment.

Herein, the sintering temperature T is from 1,300° C. to 1,650° C., preferably from 1,300° C. to 1,500° C. If T is lower than 1,300° C., the compact is little sintered. If T is higher than 1,650° C., inconveniently oxygen defects form in the material and become a light absorbing source. The sintering temperature in the range is effective for bringing the relative density as sintered to at least 95% of the true density of the inventive Tb-based complex oxide. If the relative density as sintered is less than 95% of the true density of the material, inconveniently transparentizing is not achieved by the subsequent step or HIP treatment.

The sinter holding time may be optimized so as to reach the desired relative density and is preferably up to 20 hours, though not limited thereto. If the sinter holding time is longer than 20 hours, undesirably there is a more chance of oxygen defects forming in the material.

In order that the sintered body resulting from the sintering step reach a desired crystal grain size (from 0.5 μm to 2 μm) and a sintered density or relative density of at least 95%, it is important to control the heating rate during the sintering step. In general, the crystal grain size is determined by the sintering temperature, i.e., the higher the sintering temperature, the greater becomes the crystal grain size. Namely, sintering must be terminated at a relatively low temperature in order to maintain the sintered grain size small. However, a lower sintering temperature leads to a lower relative density after sintering, failing to reach the transparentizable density of 95%. The heating rate during the sintering treatment has an impact on the sintered density. In the case of sintering at the same temperature, a higher heating rate results in a higher sintered density. It is noted that if the heating rate is high and the sintering temperature is high, grains grow so rapidly that bubbles in the sintered body are not fully eliminated, or bubbles coalesce into giant bubbles, becoming a scattering factor. For this reason, it is not a practice in the prior art to control the heating rate so high. Quite unexpectedly, the inventors have found that when the sintering temperature T is set at a relatively low temperature at which grain growth is not so promoted and the heating rate is set relatively high, bubbles do not coalesce together and are rather fully eliminated, and thus a transparent ceramic material of quality is manufactured. That is, by selecting the sintering temperature at which the crystal grain size does not become so large and heating at a high rate up to the predetermined temperature T1 wherein 1,200° C.≤T1≤T (i.e., up to at least 1,200° C.), a high density is achievable with small crystal grains.

In the sintering step wherein the compact prepared as above is sintered by heating at a sintering temperature T wherein 1,300° C.≤T≤1,650° C., the heating rate from room temperature to the predetermined temperature T1 wherein 1,200° C.≤T1≤T is at least 100° C./h, preferably from 100° C./h to 300° C./h.

The sintering temperature T and heating rate must be optimized in accordance with the amount of the sintering aid. As long as the amount of the sintering aid is 0.1% to 3% by weight, crystal grains do not grow large until the temperature rises up to 1,400° C. Then the heating rate is preferably accelerated until the temperature rises up to 1,400° C. That is, the predetermined temperature T1 is preferably from 1,200° C. to 1,400° C.

In the heating course, when the temperature exceeds 1,400° C., preferably 1,200° C., it is recommended that the heating rate set till then is not continued. If the heating rate is set as high as 100 to 300° C./h in the high-temperature region in excess of 1,400° C., grain growth is promoted rather than bubble expelling, with the risk of bubbles being taken in grains. The bubbles left within grains during sintering are not removed in the subsequent HIP treatment step, but permanently left in the transparent ceramic material, becoming a light scattering factor. Therefore, during the sintering step, in a high-temperature region in excess of 1,400° C., preferably in excess of 1,200° C., where grain growth is promoted, the heating rate is preferably set slow or low in order to control rapid grain growth and to promote bubble expelling.

It is thus preferable that the heating rate subsequent to the predetermined temperature T1 is set slow or low. Specifically, the heating rate is preferably 1 to 95° C./h, more preferably 10 to 75° C./h, even more preferably 10 to 50° C./h. Namely, the heating rate is preferably as low as possible within the acceptable range. Also, in a temperature range in excess of the predetermined temperature T1, a plurality of heating rates in the range of 1 to 95° C./h may be combined. In an example wherein T1=1,400° C., the heating profile from 1,400° C. to 1,600° C. may be set such that the heating rate is 50° C./h from 1,400° C. to 1,500° C., 10° C./h from 1,500° C. to 1,550° C., and 40° C./h from 1,550° C. to 1,600° C.

The foregoing sintering treatment yields a primary sintered body.

HIP

According to the inventive method, the sintering step is followed by post-treatment, typically hot isostatic pressing (HIP). In order to further improve the transparency of the primary sintered body resulting from the precedent sintering step, HIP sintering is performed at a high pressure of from 100 MPa to 250 MPa and a temperature of from 1,300° C. to 1,650° C., preferably from 1,300° C. to 1,600° C., for 0.5 to 3 hours. The temperature of the HIP treatment may be higher or lower than the sintering temperature and is not particularly limited as long as transparentizing is possible and the crystal grain size is up to 2 μm.

If the HIP pressure is lower than 100 MPa, bubbles are not fully eliminated during the HIP treatment. A HIP pressure in excess of 250 MPa can cause failure of the apparatus. The pressure medium for the HIP treatment is preferably an inert gas such as Ar or $N_2$, which may contain up to 10% of oxygen. It is recommended that during the HIP treatment, the primary sintered body is received in a metal container such as molybdenum, tungsten or iridium, or an oxide container such as alumina or yttria because this prevents scattering of contaminants from the heater.

The above HIP treatment yields a secondary sintered body.

Additional Steps

In the manufacturing method of the invention, the transparent complex oxide sintered body resulting from the sintering and HIP steps is preferably subjected to optical polishing at opposite end surfaces on an axis of optical utilization. The optical surface accuracy (planarity) is preferably up to λ/8, more preferably up to λ/10 wherein λ=633 nm. If the planarity exceeds λ/8, beam quality or the like may be exacerbated below the acceptable level in the optical application. The planarity of an optical surface may be measured at a transmitted wave surface or reflected wave surface.

The opposite end surfaces of the sintered body as optically polished are then coated with an antireflective film which is designed to adjust the center wavelength to 1,064 nm. This ensures precise optical measurement.

The method of the invention is successful in manufacturing a transparent ceramic material having a high overall light transmittance and a low diffuse transmittance over a broad wavelength range from short wavelength (e.g., 633 nm) to NIR.

Transparent Ceramic Material

Another embodiment of the invention is a transparent ceramic material in the form of a complex oxide sintered body represented by the formula (I):

$$(Tb_xR_{1-x})_2O_3 \tag{I}$$

wherein x is a number: 0.4≤x<1.0, and R is at least one rare earth element selected from yttrium, scandium, and lanthanoid elements (exclusive of terbium), the sintered body having a crystal grain size of from 0.5 µm to 2 µm, wherein a specimen of 11 mm long made from the sintered body has an overall light transmittance of at least 80.0% and a diffuse transmittance of up to 1.6% at wavelength 633 nm.

In formula (I), R is not particularly limited as long as it contains at least one rare earth element selected from yttrium, scandium, lanthanum, europium, gadolinium, ytterbium, holmium, and lutetium, and it may contain another element such as erbium or thulium. Most preferably R consists of at least one rare earth element selected from yttrium, scandium, lanthanum, europium, gadolinium, ytterbium, holmium, and lutetium, and does not contain another element. R may be a single element or a mixture of plural elements in an arbitrary ratio. Inter alia, R is preferably yttrium, scandium or lutetium, most preferably yttrium.

In formula (I), x is a number of from 0.4 to less than 1.0. That is, the rare earth oxide of formula (I) contains at least 40 mol %, calculated as a molar fraction, of $Tb_2O_3$. If x is less than 0.4, a high Verdet constant is unavailable.

Preferably x is from 0.4 to 0.9, more preferably from 0.45 to 0.8. A value of x in the range is preferable because a high Verdet constant is available and transparency is excellent. A value of x of up to 0.9 is preferable because cracking during cooling after crystal growth is controlled and clouding of crystals is suppressed.

The transparent ceramic material contains a sintering aid composed of an oxide of at least one element selected from Group 2 and Group 4 elements as well as the rare earth oxide. The sintering aid is preferably an oxide of at least one element selected from titanium, zirconium, hafnium, calcium, and magnesium.

The sintering aid composed of such oxide is present in an amount of from 0.1% to 3% by weight, more preferably from 0.5% to 3% by weight, calculated as oxide of sintering aid, based on the total weight of the rare earth complex oxide (main component). If the amount is less than 0.1% by weight, the sintering aid effect is not consistently exerted and the insertion loss at wavelength 1,064 nm may exceed 0.99 dB. If the amount exceeds 3% by weight, the sintering aid will precipitate out singly without forming a solid solution, causing laser beam scattering, and the insertion loss may exceed 0.99 dB.

The fired body of the invention is a sintered body manufactured by the method for manufacturing a transparent ceramic material and preferably a transparent complex oxide sintered body having the compositional formula: $(Tb_xY_{1-x})_2O_3$ wherein x is a number: 0.4≤x≤0.9. If x is less than 0.4, a high Verdet constant is unavailable. Thus x is preferably at least 0.4. If x is more than 0.9, the phase transition of terbium is uncontrollable. Thus x is preferably up to 0.9.

The transparent ceramic material has a crystal grain size of from 0.5 µm to 2 µm, preferably from 0.6 µm to 1.9 µm, more preferably from 0.8 µm to 1.6 µm. The grain size in the range ensures that the transparent ceramic material is transparent and restrains RGD scattering.

The crystal grain size of the transparent ceramic material refers to an average grain size of crystal grains in the secondary sintered body after HIP treatment, and may be determined by directly observing a polished surface of the ceramic material under a microscope or the like, for example, a reflection electron image under electron microscope (SEM). If the judgment of grain size on a polished surface is difficult, the surface is subjected to thermal etching at 1,200° C. or 0.1M dilute hydrochloric acid treatment for grain boundaries to appear prominent. The crystal grain size (or diameter of grains) may be determined according to the formula:

$$D=1.56C/(MN) \tag{1}$$

wherein C is the length of an arbitrary line drawn on a high-resolution image under SEM, N is the number of grains on the line, and M is the magnification of the image (see Journal of the American Ceramic Society Discussions and Notes, 1972, February 109). Herein N is preferably at least 10, more preferably at least 100.

A specimen of 11 mm long made from the transparent ceramic material has an overall light transmittance of at least 80.0%, preferably at least 80.1%, more preferably at least 80.3% at wavelength 633 nm. At the same time, the specimen of 11 mm long made from the transparent ceramic material has a diffuse transmittance of up to 1.6%, preferably up to 1.2%, more preferably up to 1.1% at wavelength 633 nm.

Furthermore, a specimen of 11 mm long made from the transparent ceramic material has an overall light transmittance of at least 80.2%, preferably at least 80.3%, more preferably at least 80.9% at wavelength 1,064 nm. At the same time, the specimen of 11 mm long made from the transparent ceramic material has a diffuse transmittance of up to 0.7%, preferably up to 0.6%, more preferably up to 0.5% at wavelength 1,064 nm.

As used herein, the "overall light transmittance" and "diffuse transmittance" are measured on an optically polished specimen of transparent ceramic material having a length (optical path length) of 11 mm with reference to JIS K7105 (ISO 13468-2:1999). Specifically, an integrating sphere is provided with an inlet opening and an outlet opening for light passage. A sample is placed at the inlet opening. A reflector is placed at the outlet opening. Then all light emerging from the sample is detectable by the integrating sphere. A component of overall light rays other than those in traveling direction is detected, with the reflector at the outlet opening removed. A ratio of the intensity of the detected light to the intensity of incident light to the sample is the diffuse transmittance. A ratio of the intensity of the emergent light detected without removing the reflector at the outlet opening to the intensity of incident light to the sample is the overall light transmittance.

Magneto-Optical Device

The transparent ceramic material of the invention is suited as magneto-optical parts for use in magneto-optical devices. In particular, the ceramic material is advantageously used as a Faraday rotator of an optical isolator which is used in a wavelength region of 0.5 to 1.1 μm, i.e., in the visible to NIR region.

Figure 1:
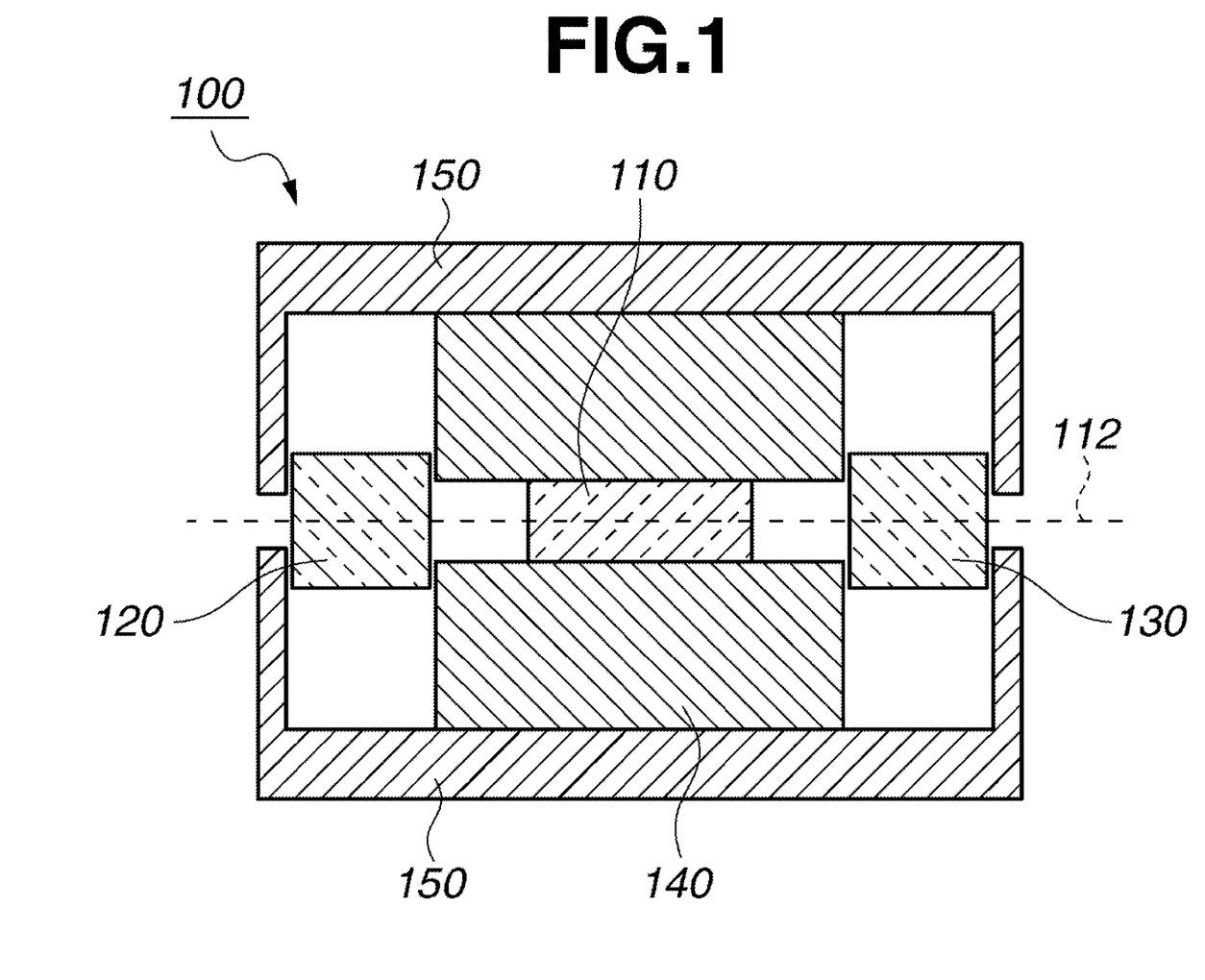
FIG. 1 is a schematic cross-sectional view of an optical isolator.

FIG. 1 is a schematic cross-sectional view of an optical isolator as a typical magneto-optical device having a Faraday rotator. In FIG. 1, the optical isolator 100 comprises a Faraday rotator 110 of the transparent ceramic material, a polarizer 120 and an analyzer 130 of polarizing material arranged upstream and downstream of the Faraday rotator 110. In the optical isolator 100, polarizer 120, Faraday rotator 110 and analyzer 130 are arranged on an optical axis 112 in the order of 120-110-130, and preferably, a magnet 140 is rested on at least one side surface of those components. The magnet 140 is preferably received in a housing 150.

The isolator is preferably used in a fiber laser for a processing machine. Specifically, it is suitably used to prevent the laser light emitted by the laser component from being reflected back to the component to make its oscillation unstable.

EXAMPLES

Examples and Comparative Examples are given below for further illustrating the invention although the invention is not limited thereto.

Example 1

Example 1-1

Terbium oxide powder ($Tb_4O_7$, purity ≥99.9 wt %) and yttrium oxide powder ($Y_2O_3$, purity ≥99.9 wt %), both available from Shin-Etsu Chemical Co., Ltd., were weighed in such amounts totaling to 50 g that a molar ratio of Tb:Y was 50:50. These powders and 0.2 g (corresponding to 0.5% by weight, calculated as oxide, of the sintering aid) of a zirconia precursor to serve as a sintering aid (compositional formula: $ZrOCl_2$, purity ≥99.9 wt %, by Daiichi Kigenso Kagaku Kogyo Co., Ltd.) were dissolved in 200 ml of an acidic solution (compositional formula: $HNO_3$, concentration: 43 wt %, by Wako Pure Chemical Corp.). Then a basic solution (compositional formula: $NH_3$, concentration: 23 wt %, by Wako Pure Chemical Corp.) was added dropwise to the solution whereupon a substantially insoluble hydroxide salt precipitated. The hydroxide salt thus precipitated was collected on a Buchner funnel and fired in oxygen atmosphere at 1,000° C. for 3 hours, obtaining terbium-containing oxide ($Tb_{0.5}Y_{0.5})_2O_3$ particles.

The terbium-containing oxide particles was added to a predetermined amount of ethanol, which was fed into a resinous pot together with zirconia balls (average diameter 2 mm, by Nikkato Co., Ltd.) as milling media, 0.1 g of polyoxyethylene alkyl ether dispersant (polyoxyethylene stearyl ether, by Wako Pure Chemical Corp.) and 1.0 g of polyvinyl alcohol binder (JMR-10L by Japan Vam & Poval Co., Ltd.) as organic additives. The mixture was ball milled into a slurry. The ball milling time was 20 hours. The slurry mixture was granulated by a spray drying technique and sieved, obtaining granules of a predetermined size (average particle size 250 μm).

The resulting granules were molded in a uniaxial press mold and cold isostatic pressed (CIP) into a cylindrical compact having a diameter of 7 mm and a height of 16 mm.

The compact was subjected to binder burnout by heating in air atmosphere at 600° C. for 20 hours. The heating rate was 20° C./h.

The compact after binder burnout was sintered by heating in vacuum at 1,500° C. for 2 hours, obtaining a primary sintered body. In the sintering step, temperature T1 was 1,300° C. That is, the heating rate from room temperature to 1,300° C. (heating rate up to temperature T1) was 100° C./h, and the heating rate to a higher temperature (heating rate subsequent to temperature T1) was 20° C./h.

The primary sintered body was placed in a molybdenum container and subjected to HIP treatment at 198 MPa and 1,500° C. for 3 hours, obtaining a secondary sintered body.

The thus obtained transparent ceramic material was ground and polished to a length of 11 mm. The optical end surfaces of each sample were subjected to final optical polishing at an optical surface accuracy of λ/8 (wherein λ=633 nm) and coated with an antireflective film which was designed so as to adjust the center wavelength to 1,064 nm.

The specimen thus obtained was measured for several properties.

Relative Density of Primary Sintered Body

The relative density (%) of the primary sintered body was determined by measuring the density of the primary sintered body by Archimedes' method, dividing the density by the true density, and multiplying the quotient by 100.

Average Grain Size of Secondary Sintered Body

The secondary sintered body was observed under SEM after optical polishing and thermal etching at 1,200° C. for grain boundaries to appear prominent. The grain size was calculated by the above-described procedure according to formula (1). The number of grains N is Overall Light Transmittance and Diffuse Transmittance The secondary sintered body was determined for overall light transmittance and diffuse transmittance with reference to JIS K7105 (ISO 13468-2:1999) by combining a commercial UV/Vis spectrometer (model V-670 by JASCO Corp.) with an integrating sphere. The sphere was provided with a pinhole such that light was irradiated to a spot having a diameter of 3 mm. Measurement was performed in the double beam mode using a halogen lamp as the light source, and a photomultiplier (wavelength <750 nm) and a PbS photoelectric cell (wavelength 750 nm) as the detector. The overall light transmittance and diffuse transmittance were measured at wavelengths 1,064 nm and 633 nm. For each set of conditions, five specimens were measured, from which an average value (two significant figures, unit in percent) was computed and evaluated.

Insertion Loss

An insertion loss was computed from the overall light transmittance and diffuse transmittance measured as above at wavelengths 1,064 nm and 633 nm, according to the following formula (2).

$$\text{Insertion loss (dB)} = -10 \log \left[ \{(\text{overall light transmittance},\%) - (\text{diffuse transmittance},\%)\}/100 \right] \quad (2)$$

Verdet Constant

A ceramic sample is inserted into a center bore of a neodymium-iron-boron magnet of outer diameter 32 mm, inner diameter 6 mm, and length 40 mm, and polarizers are fitted at both ends. By using a high-power laser (beam diameter 1.6 mm, IPG Photonics Japan Co., Ltd.), and letting a high-power laser beam of wavelength 1,064 nm enter both the end surfaces, a Faraday rotation angle θ is determined. The Faraday rotation angle θ is an angle at which the maximum transmittance is obtained when the polarizer on the emergent side is rotated. A Verdet constant V is determined from the following equation. The strength (H) of magnetic field applied to the sample is computed by simulation from the size of the measurement system, residual magnet flux density (Br), and coercive force (Hc).

$$\theta = V \times H \times L$$

Herein θ is a Faraday rotation angle (min), V is a Verdet constant, H is the strength of magnetic field (Oe), and L is the length of the Faraday rotator (=11 mm in this example).

Examples 1-2 to 1-10 and Comparative Examples 1-1 to 1-8

Secondary sintered body samples were manufactured under the same conditions as in Example 1-1 except that at least any one of the heating rate up to the predetermined temperature T1, sintering temperature T, and HIP temperature was changed. In Comparative Examples 1-3 and 1-4, the sintering temperature T was 1,200° C. and the heating rate up to 1,200° C. was a constant rate of 100° C./h and 200° C./h, respectively.

Figure 2:
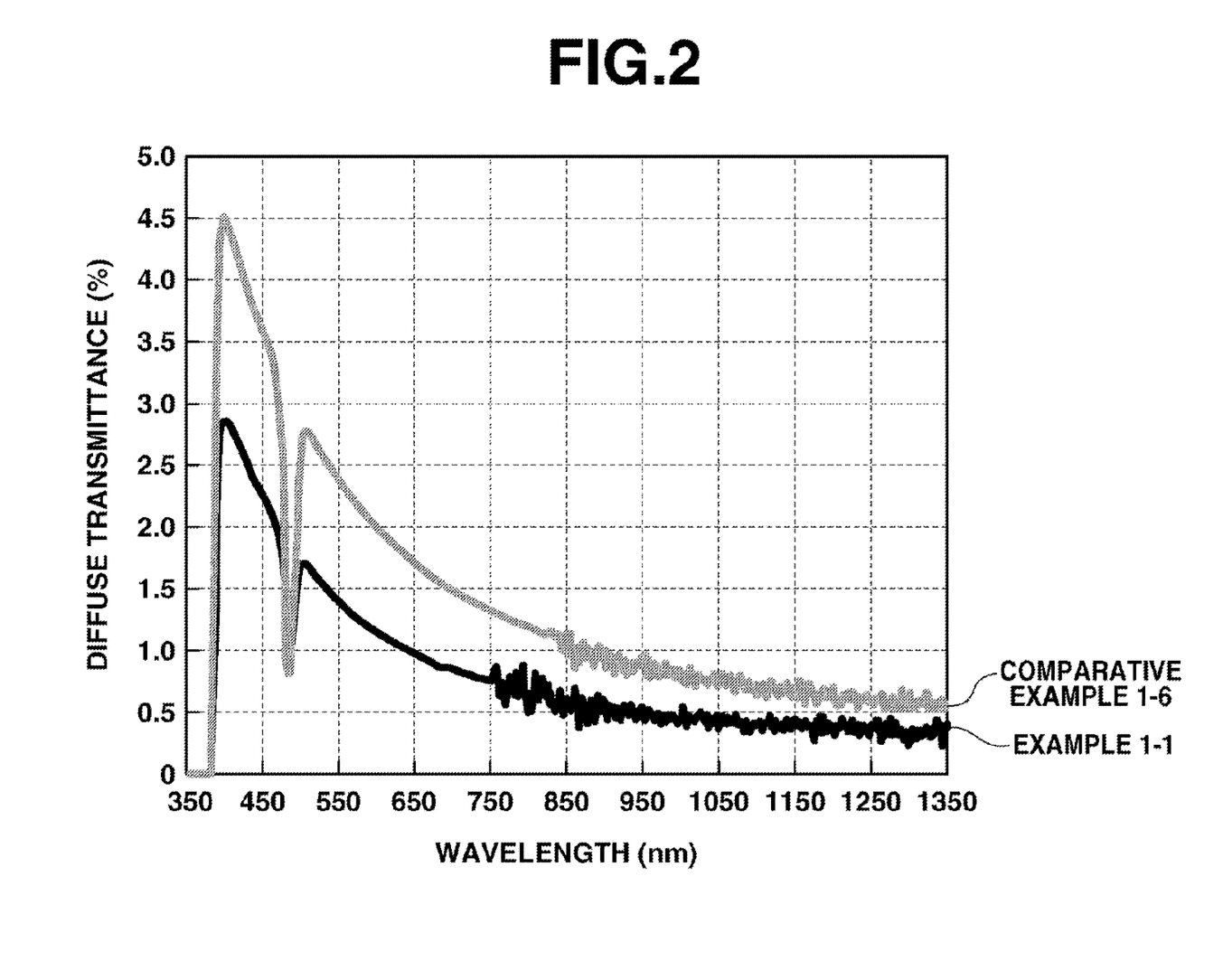
FIG. 2 is a diagram showing diffuse transmittance spectra of Example 1-1 and Comparative Example 1-6.

The results of Examples 1-1 to 1-10 and Comparative Examples 1-1 to 1-8 are tabulated in Tables 1 and 2. FIG. 2 is a diagram showing diffuse transmittance spectra of Example 1-1 and Comparative Example 1-6.

TABLE 1

| | | | Example | | | | | |
|---|---|---|---|---|---|---|---|---|
| | | | 1-1 | 1-2 | 1-3 | 1-4 | 1-5 | 1-6 |
| Raw material | Terbium oxide | Molar ratio (%) | 50 | 50 | 50 | 50 | 50 | 50 |
| | Rare earth oxide | Type | $Y_2O_3$ | $Y_2O_3$ | $Y_2O_3$ | $Y_2O_3$ | $Y_2O_3$ | $Y_2O_3$ |
| | | Molar ratio (%) | 50 | 50 | 50 | 50 | 50 | 50 |
| | Sintering aid | Type | $ZrO_2$ | $ZrO_2$ | $ZrO_2$ | $ZrO_2$ | $ZrO_2$ | $ZrO_2$ |
| | | Content (wt %) | 0.5 | 0.5 | 0.5 | 0.5 | 0.5 | 0.5 |
| Steps | Source powder preparation | | 3-component co-precipitation | | | | | |
| | Sintering | Sintering temp. T (° C.) | 1,500 | 1,500 | 1,500 | 1,500 | 1,500 | 1,500 |
| | | Temperature T1 (° C.) | 1,300 | 1,300 | 1,300 | 1,300 | 1,300 | 1,300 |
| | | Heating rate (° C./h) up to T1 | 100 | 150 | 200 | 250 | 300 | 100 |
| | | subsequent to T1 | 20 | 20 | 20 | 20 | 20 | 20 |
| | | Time (hr) | 2 | 2 | 2 | 2 | 2 | 2 |
| | | Atmosphere | vacuum | vacuum | vacuum | vacuum | vacuum | vacuum |
| | HIP | Temperature (° C.) | 1,500 | 1,500 | 1,500 | 1,500 | 1,500 | 1,600 |
| | | Heating rate (° C./h) | 300 | 300 | 300 | 300 | 300 | 300 |
| | | Time (hr) | 3 | 3 | 3 | 3 | 3 | 3 |
| | | Pressure (MPa) | 198 | 198 | 198 | 198 | 198 | 198 |
| Evaluation results | Relative density (%) of primary sintered body | | 95.8 | 96.2 | 96.8 | 97.6 | 98.2 | 96.0 |
| | Average grain size (μm) of secondary sintered body | | 1.2 | 1.2 | 1.2 | 1.2 | 1.2 | 1.9 |
| | Overall light transmittance (%) | @ 633 nm | 80.72 | 80.99 | 80.79 | 80.70 | 80.68 | 80.76 |
| | | @ 1,064 nm | 80.94 | 81.14 | 81.10 | 80.80 | 80.95 | 80.83 |
| | Diffuse transmittance (%) | @ 633 nm | 0.93 | 1.01 | 0.99 | 1.08 | 1.06 | 1.14 |
| | | @ 1,064 nm | 0.40 | 0.42 | 0.38 | 0.45 | 0.41 | 0.48 |
| | Insertion loss (dB) | @ 633 nm | 1.00 | 0.99 | 1.00 | 1.01 | 1.01 | 1.01 |
| | | @ 1,064 nm | 0.96 | 0.95 | 0.95 | 0.97 | 0.96 | 0.97 |

| | | | Example | | | |
|---|---|---|---|---|---|---|
| | | | 1-7 | 1-8 | 1-9 | 1-10 |
| Raw material | Terbium oxide | Molar ratio (%) | 50 | 50 | 50 | 50 |
| | Rare earth oxide | Type | $Y_2O_3$ | $Y_2O_3$ | $Y_2O_3$ | $Y_2O_3$ |
| | | Molar ratio (%) | 50 | 50 | 50 | 50 |
| | Sintering aid | Type | $ZrO_2$ | $ZrO_2$ | $ZrO_2$ | $ZrO_2$ |
| | | Content (wt %) | 0.5 | 0.5 | 0.5 | 0.5 |
| Steps | Source powder preparation | | 3-component co-precipitation | | | |
| | Sintering | Sintering temp. T (° C.) | 1,500 | 1,300 | 1,400 | 1,400 |
| | | Temperature T1 (° C.) | 1,300 | 1,300 | 1,300 | 1,300 |
| | | Heating rate (° C./h) up to T1 | 100 | 300 | 200 | 100 |
| | | subsequent to T1 | 20 | — | 20 | 20 |
| | | Time (hr) | 2 | 2 | 2 | 2 |
| | | Atmosphere | vacuum | vacuum | vacuum | vacuum |
| | HIP | Temperature (° C.) | 1,400 | 1,300 | 1,400 | 1,400 |
| | | Heating rate (° C./h) | 300 | 300 | 300 | 300 |
| | | Time (hr) | 3 | 3 | 3 | 3 |
| | | Pressure (MPa) | 198 | 198 | 198 | 198 |
| Evaluation results | Relative density (%) of primary sintered body | | 96.0 | 95.4 | 95.4 | 95.1 |
| | Average grain size (μm) of secondary sintered body | | 0.9 | 0.6 | 0.8 | 0.8 |
| | Overall light transmittance (%) | @ 633 nm | 80.81 | 80.53 | 80.78 | 80.80 |
| | | @ 1,064 nm | 81.11 | 80.63 | 80.88 | 80.83 |

TABLE 1-continued

|  |  |  | | | |
|---|---|---|---|---|---|
| Diffuse transmittance (%) | @ 633 nm | 1.01 | 1.10 | 1.16 | 1.19 |
|  | @ 1,064 nm | 0.39 | 0.46 | 0.41 | 0.44 |
| Insertion loss (dB) | @ 633 nm | 1.00 | 1.02 | 1.01 | 1.01 |
|  | @ 1,064 nm | 0.95 | 0.98 | 0.97 | 0.97 |

TABLE 2

| | | | Comparative Example | | | | | | | |
|---|---|---|---|---|---|---|---|---|---|---|
| | | | 1-1 | 1-2 | 1-3 | 1-4 | 1-5 | 1-6 | 1-7 | 1-8 |
| Raw material | Terbium oxide | Molar ratio (%) | 50 | 50 | 50 | 50 | 50 | 50 | 50 | 50 |
| | Rare earth oxide | Type | $Y_2O_3$ | $Y_2O_3$ | $Y_2O_3$ | $Y_2O_3$ | $Y_2O_3$ | $Y_2O_3$ | $Y_2O_3$ | $Y_2O_3$ |
| | | Molar ratio (%) | 50 | 50 | 50 | 50 | 50 | 50 | 50 | 50 |
| | Sintering aid | Type | $ZrO_2$ | $ZrO_2$ | $ZrO_2$ | $ZrO_2$ | $ZrO_2$ | $ZrO_2$ | $ZrO_2$ | $ZrO_2$ |
| | | Content (wt %) | 0.5 | 0.5 | 0.5 | 0.5 | 0.5 | 0.5 | 0.5 | 0.5 |
| Steps | Source powder preparation | | 3-component co-precipitation | | | | | | | |
| | Sintering | Sintering temp. T (° C.) | 1,500 | 1,500 | 1,200 | 1,200 | 1,500 | 1,700 | 1,700 | 1,700 |
| | | Temperature T1 (° C.) | 1,300 | 1,300 | 1,200 | 1,200 | 1,300 | 1,300 | 1,300 | 1,300 |
| | | Heating rate (° C./h) up to T1 | 50 | 20 | 100 | 200 | 100 | 100 | 200 | 20 |
| | | subsequent to T1 | 20 | 20 | — | — | 20 | 20 | 20 | 20 |
| | | Time (hr) | 2 | 2 | 2 | 2 | 2 | 2 | 2 | 2 |
| | | Atmosphere | vacuum | vacuum | vacuum | vacuum | vacuum | vacuum | vacuum | vacuum |
| | HIP | Temperature (° C.) | 1,500 | 1,500 | 1,300 | 1,300 | 1,800 | 1,800 | 1,800 | 1,800 |
| | | Heating rate (° C./h) | 300 | 300 | 300 | 300 | 300 | 300 | 300 | 300 |
| | | Time (hr) | 3 | 3 | 3 | 3 | 3 | 3 | 3 | 3 |
| | | Pressure (MPa) | 198 | 198 | 198 | 198 | 198 | 198 | 198 | 198 |
| Evaluation results | Relative density (%) of primary sintered body | | 93.8 | 88.2 | 84.2 | 85.1 | 95.8 | 99.1 | 99.6 | 96.8 |
| | Average grain size (μm) of secondary sintered body | | 1.2 | 1.2 | 0.4 | 0.4 | 5.8 | 5.8 | 5.8 | 5.8 |
| | Overall light transmittance (%) | @ 633 nm | devitrified | devitrified | devitrified | devitrified | 79.28 | 80.27 | 80.24 | 80.27 |
| | | @ 1,064 nm | devitrified | devitrified | devitrified | devitrified | 80.09 | 80.66 | 80.84 | 80.78 |
| | Diffuse transmittance (%) | @ 633 nm | devitrified | devitrified | devitrified | devitrified | 2.90 | 1.93 | 2.44 | 1.93 |
| | | @ 1,064 nm | devitrified | devitrified | devitrified | devitrified | 1.2 | 0.68 | 0.86 | 0.61 |
| | Insertion loss (dB) | @ 633 nm | devitrified | devitrified | devitrified | devitrified | 1.17 | 1.06 | 1.09 | 1.06 |
| | | @ 1,064 nm | devitrified | devitrified | devitrified | devitrified | 1.03 | 0.97 | 0.97 | 0.96 |

It is evident from the above that in Examples 1-1 to 1-10 wherein the heating rate up to 1,300° C. during the sintering treatment is in a range of 100 to 300° C./h, samples having a fully high density and high transparency (overall light transmittance of at least 80.5% at either wavelength 633 nm or 1,064 nm) were obtained even when the sintering temperature was as relatively low as 1,500° C.

By contrast, in Comparative Examples 1-1 and 1-2 wherein the heating rate up to 1,300° C. is as low as 50° C./h and 20° C./h, samples devitrified without reaching a high density. When a multiplicity of samples were manufactured under these sintering conditions, some samples were transparent, but the yield of transparent samples was low.

In Comparative Examples 1-3 and 1-4 wherein the sintering temperature is as low as 1,200° C., samples devitrified.

In Comparative Examples 1-5 to 1-8 wherein HIP treatment is at 1,800° C. as in Patent Document 3, the overall light transmittance at wavelength 633 nm was from 79.2 to 80.3%, indicating a certain degree of transparency. However, since the secondary sintered body had crystal grains grown to a size in excess of 5 μm, its diffuse transmittance at wavelength 633 nm increased to 1.93 to 2.90% and its insertion loss increased to 1.06 dB or higher.

By contrast, in Examples 1-1 to 1-10, the secondary sintered body was transparentized while its crystal grains were kept to a size of up to 2 μm. Then, its diffuse transmittance at wavelength 633 nm was suppressed as low as 1% and as a result, its insertion loss was suppressed as low as 1.02 dB or below. It also showed an overall light transmittance of at least 80.5% and a diffuse transmittance of up to 1.2% at wavelength 633 nm, and an overall light transmittance of at least 80.6% and a diffuse transmittance of up to 0.5% at wavelength 1,064 nm. With respect to the insertion loss at wavelength 1,064 nm, no substantial difference is found between Examples 1-1 to 1-10 and Comparative Examples 1-6 to 1-8.

Furthermore, as shown in FIG. 1, the diffuse transmittance of Example 1-1 is lower than that of Comparative Example 1-6 at all wavelengths.

By synthesizing a transparent body from a secondary sintered body having a crystal grain size of up to 2 μm as in Examples, scattering of transmitted light inclusive of the visible region on short wavelength side is suppressed. Thus a transparent ceramic material functioning as a magneto-optical part over a broad range from visible to NIR is manufactured.

The magneto-optical effect of Example 1-1 was measured to find a Verdet constant of 0.255 min/(Oe·cm). This value is about 2 times the value of conventional material TGG ($Tb_3Ga_5O_{12}$). This suggests that the inventive material is fully useful as magneto-optical parts.

Example 2

Examples 2-1 to 2-22

Secondary sintered body samples were manufactured under the same conditions as in Example 1-1 except that at least any one of the molar ratio of Tb/Y, the type and amount of sintering aid was changed. They were similarly evaluated. The results are shown in Tables 3 and 4.

TABLE 3

| | | | | Example | | | | | |
|---|---|---|---|---|---|---|---|---|---|
| | | | | 2-1 | 2-2 | 2-3 | 2-4 | 2-5 | 2-6 |
| Raw material | Terbium oxide | Molar ratio (%) | | 40 | 40 | 40 | 40 | 50 | 50 |
| | Rare earth oxide | Type | | $Y_2O_3$ | $Y_2O_3$ | $Y_2O_3$ | $Y_2O_3$ | $Y_2O_3$ | $Y_2O_3$ |
| | | Molar ratio (%) | | 60 | 60 | 60 | 60 | 50 | 50 |
| | Sintering aid | Type | | $ZrO_2$ | $ZrO_2$ | $HfO_2$ | $HfO_2$ | $ZrO_2$ | $ZrO_2$ |
| | | Content (wt %) | | 1 | 3 | 1 | 3 | 1 | 3 |
| Steps | Source powder preparation | | | 3-component co-precipitation | | | | | |
| | Sintering | Sintering temp. T (° C.) | | 1,500 | 1,600 | 1,400 | 1,550 | 1,500 | 1,600 |
| | | Temperature T1 (° C.) | | 1,300 | 1,300 | 1,300 | 1,300 | 1,300 | 1,300 |
| | | Heating rate (° C./h) | up to T1 | 100 | 100 | 100 | 100 | 100 | 100 |
| | | | subsequent to T1 | 20 | 20 | 20 | 20 | 20 | 20 |
| | | Time (hr) | | 2 | 2 | 2 | 2 | 2 | 2 |
| | | Atmosphere | | vacuum | vacuum | vacuum | vacuum | vacuum | vacuum |
| | HIP | Temperature (° C.) | | 1,500 | 1,600 | 1,400 | 1,550 | 1,500 | 1,600 |
| | | Heating rate (° C./h) | | 300 | 300 | 300 | 300 | 300 | 300 |
| | | Time (hr) | | 3 | 3 | 3 | 3 | 3 | 3 |
| | | Pressure (MPa) | | 198 | 198 | 198 | 198 | 198 | 198 |
| Evaluation results | Relative density (%) of primary sintered body | | | 96.8 | 95.4 | 96.6 | 96.1 | 96.2 | 95.9 |
| | Average grain size (μm) of secondary sintered body | | | 0.9 | 1.1 | 1.2 | 0.8 | 0.9 | 0.9 |
| | Overall light transmittance (%) | @ 633 nm | | 80.19 | 80.31 | 80.52 | 80.37 | 80.24 | 80.39 |
| | | @ 1,064 nm | | 80.40 | 80.43 | 80.58 | 80.44 | 80.38 | 80.45 |
| | Diffuse transmittance (%) | @ 633 nm | | 0.94 | 1.06 | 0.91 | 1.12 | 0.99 | 1.14 |
| | | @ 1,064 nm | | 0.42 | 0.45 | 0.41 | 0.46 | 0.40 | 0.47 |
| | Insertion loss (dB) | @ 633 nm | | 1.01 | 1.01 | 0.99 | 1.01 | 1.01 | 1.01 |
| | | @ 1,064 nm | | 0.97 | 0.97 | 0.96 | 0.97 | 0.97 | 0.97 |

| | | | | Example | | | |
|---|---|---|---|---|---|---|---|
| | | | | 2-7 | 2-8 | 2-9 | 2-10 |
| Raw material | Terbium oxide | Molar ratio (%) | | 50 | 50 | 50 | 50 |
| | Rare earth oxide | Type | | $Y_2O_3$ | $Y_2O_3$ | $Y_2O_3$ | $Y_2O_3$ |
| | | Molar ratio (%) | | 50 | 50 | 50 | 50 |
| | Sintering aid | Type | | $HfO_2$ | $HfO_2$ | $ZrO_2$ | $HfO_2$ |
| | | Content (wt %) | | 1 | 3 | 0.1 | 0.1 |
| Steps | Source powder preparation | | | 3-component co-precipitation | | | |
| | Sintering | Sintering temp. T (° C.) | | 1,500 | 1,550 | 1,300 | 1,300 |
| | | Temperature T1 (° C.) | | 1,300 | 1,300 | 1,300 | 1,300 |
| | | Heating rate (° C./h) | up to T1 | 100 | 100 | 100 | 100 |
| | | | subsequent to T1 | 20 | 20 | — | — |
| | | Time (hr) | | 2 | 2 | 2 | 2 |
| | | Atmosphere | | vacuum | vacuum | vacuum | vacuum |
| | HIP | Temperature (° C.) | | 1,600 | 1,600 | 1,300 | 1,300 |
| | | Heating rate (° C./h) | | 300 | 300 | 300 | 300 |
| | | Time (hr) | | 3 | 3 | 3 | 3 |
| | | Pressure (MPa) | | 198 | 198 | 198 | 198 |
| Evaluation results | Relative density (%) of primary sintered body | | | 97.8 | 96.1 | 96.8 | 96.1 |
| | Average grain size (μm) of secondary sintered body | | | 1.6 | 1.1 | 0.9 | 1.0 |
| | Overall light transmittance (%) | @ 633 nm | | 80.51 | 80.18 | 80.43 | 80.54 |
| | | @ 1,064 nm | | 80.75 | 80.43 | 80.59 | 80.76 |

TABLE 3-continued

|  |  |  | | | | |
|---|---|---|---|---|---|---|
| Diffuse | @ 633 nm | | 0.89 | 1.11 | 0.99 | 0.92 |
| transmittance | @ 1,064 nm | | 0.40 | 0.45 | 0.42 | 0.41 |
| (%) | | | | | | |
| Insertion loss | @ 633 nm | | 0.99 | 1.02 | 1.00 | 0.99 |
| (dB) | @ 1,064 nm | | 0.95 | 0.97 | 0.96 | 0.95 |

TABLE 4

|  |  |  |  | Example | | | | | | |
|---|---|---|---|---|---|---|---|---|---|---|
|  |  |  |  | 2-11 | 2-12 | 2-13 | 2-14 | 2-15 | 2-16 | 2-17 |
| Raw material | Terbium oxide | | Molar ratio (%) | 60 | 60 | 60 | 60 | 70 | 70 | 70 |
|  | Rare earth oxide | | Type | $Y_2O_3$ | $Y_2O_3$ | $Y_2O_3$ | $Y_2O_3$ | $Y_2O_3$ | $Y_2O_3$ | $Y_2O_3$ |
|  |  | | Molar ratio (%) | 40 | 40 | 40 | 40 | 30 | 30 | 30 |
|  | Sintering aid | | Type | $ZrO_2$ | $ZrO_2$ | $HfO_2$ | $HfO_2$ | $ZrO_2$ | $ZrO_2$ | $HfO_2$ |
|  |  | | Content (wt %) | 1 | 3 | 1 | 3 | 1 | 3 | 1 |
| Steps | Source powder preparation | | | | | | 3-component co-precipitation | | | |
|  | Sintering | Sintering temp. T (° C.) | | 1,500 | 1,600 | 1,400 | 1,550 | 1,500 | 1,600 | 1,400 |
|  |  | Temperature T1 (° C.) | | 1,300 | 1,300 | 1,300 | 1,300 | 1,300 | 1,300 | 1,300 |
|  |  | Heating rate (° C./h) | up to T1 | 100 | 100 | 100 | 100 | 100 | 100 | 100 |
|  |  |  | subsequent to T1 | 20 | 20 | 20 | 20 | 20 | 20 | 20 |
|  |  | Time (hr) | | 2 | 2 | 2 | 2 | 2 | 2 | 2 |
|  |  | Atmosphere | | vacuum | vacuum | vacuum | vacuum | vacuum | vacuum | vacuum |
|  | HIP | Temperature (° C.) | | 1,550 | 1,600 | 1,600 | 1,600 | 1,500 | 1,600 | 1,450 |
|  |  | Heating rate (° C./h) | | 300 | 300 | 300 | 300 | 300 | 300 | 300 |
|  |  | Time (hr) | | 3 | 3 | 3 | 3 | 3 | 3 | 3 |
|  |  | Pressure (MPa) | | 198 | 198 | 198 | 198 | 198 | 198 | 198 |
| Evaluation results | Relative density (%) of primary sintered body | | | 96.2 | 95.4 | 95.9 | 95.2 | 96.2 | 96.1 | 95.8 |
|  | Average grain size (μm) of secondary sintered body | | | 0.8 | 1.1 | 1.9 | 1.2 | 1.1 | 0.8 | 1.1 |
|  | Overall light transmittance (%) | @ 633 nm | | 80.39 | 80.19 | 80.55 | 80.47 | 80.58 | 80.19 | 80.16 |
|  |  | @ 1,064 nm | | 80.59 | 80.46 | 80.79 | 80.63 | 80.78 | 80.44 | 80.59 |
|  | Diffuse transmittance (%) | @ 633 nm | | 0.96 | 1.12 | 0.93 | 1.04 | 0.96 | 1.12 | 0.91 |
|  |  | @ 1,064 nm | | 0.42 | 0.48 | 0.44 | 0.46 | 0.43 | 0.46 | 0.42 |
|  | Insertion loss (dB) | @ 633 nm | | 1.00 | 1.02 | 0.99 | 1.00 | 0.99 | 1.02 | 1.01 |
|  |  | @ 1,064 nm | | 0.96 | 0.97 | 0.95 | 0.96 | 0.95 | 0.97 | 0.96 |

|  |  |  |  | Example | | | | |
|---|---|---|---|---|---|---|---|---|
|  |  |  |  | 2-18 | 2-19 | 2-20 | 2-21 | 2-22 |
| Raw material | Terbium oxide | | Molar ratio (%) | 70 | 80 | 80 | 80 | 80 |
|  | Rare earth oxide | | Type | $Y_2O_3$ | $Y_2O_3$ | $Y_2O_3$ | $Y_2O_3$ | $Y_2O_3$ |
|  |  | | Molar ratio (%) | 30 | 20 | 20 | 20 | 20 |
|  | Sintering aid | | Type | $HfO_2$ | $ZrO_2$ | $ZrO_2$ | $HfO_2$ | $HfO_2$ |
|  |  | | Content (wt %) | 3 | 1 | 3 | 1 | 3 |
| Steps | Source powder preparation | | | | | 3-component co-precipitation | | |
|  | Sintering | Sintering temp. T (° C.) | | 1,550 | 1,500 | 1,600 | 1,400 | 1,550 |
|  |  | Temperature T1 (° C.) | | 1,300 | 1,300 | 1,300 | 1,300 | 1,300 |
|  |  | Heating rate (° C./h) | up to T1 | 100 | 100 | 100 | 100 | 100 |
|  |  |  | subsequent to T1 | 20 | 20 | 20 | 20 | 20 |
|  |  | Time (hr) | | 2 | 2 | 2 | 2 | 2 |
|  |  | Atmosphere | | vacuum | vacuum | vacuum | vacuum | vacuum |
|  | HIP | Temperature (° C.) | | 1,600 | 1,600 | 1,650 | 1,400 | 1,550 |
|  |  | Heating rate (° C./h) | | 300 | 300 | 300 | 300 | 300 |
|  |  | Time (hr) | | 3 | 3 | 3 | 3 | 3 |
|  |  | Pressure (MPa) | | 198 | 198 | 198 | 198 | 198 |
| Evaluation results | Relative density (%) of primary sintered body | | | 95.2 | 96.8 | 96.1 | 96.4 | 96.1 |
|  | Average grain size (μm) of secondary sintered body | | | 1.6 | 1.4 | 1.1 | 0.9 | 1.1 |
|  | Overall light transmittance (%) | @ 633 nm | | 80.12 | 80.06 | 80.16 | 80.36 | 80.43 |
|  |  | @ 1,064 nm | | 80.43 | 80.41 | 80.44 | 80.59 | 80.67 |

TABLE 4-continued

| | | 633 nm | 1.05 | 0.99 | 1.10 | 0.93 | 1.18 |
|---|---|---|---|---|---|---|---|
| Diffuse transmittance (%) | | @ 633 nm | 1.05 | 0.99 | 1.10 | 0.93 | 1.18 |
| | | @ 1,064 nm | 0.45 | 0.43 | 0.46 | 0.42 | 0.46 |
| Insertion loss (dB) | | @ 633 nm | 1.02 | 1.02 | 1.02 | 1.00 | 1.01 |
| | | @ 1,064 nm | 0.97 | 0.97 | 0.97 | 0.96 | 0.96 |

As seen from the above, the invention ensures that a transparent body is synthesized from a secondary sintered body having a crystal grain size of up to 2 μm, independent of the molar ratio of complex oxide and the type and amount of sintering aid, which vary in the predetermined ranges to constitute the sintered body. The diffuse transmittance at wavelength 633 nm is suppressed as low as 1% and the insertion loss is reduced to 1.02 dB or below. The sample also shows an overall light transmittance of at least 80.0% and a diffuse transmittance of up to 1.2% at wavelength 633 nm, and an overall light transmittance of at least 80.4% and a diffuse transmittance of up to 0.5% at wavelength 1,064 nm. According to the invention, a transparent ceramic material functioning as a magneto-optical part over a broad range from visible to NIR is manufactured.

Example 3

Examples 3-1 to 3-4

Secondary sintered body samples were manufactured under the same conditions as in Example 2-7 except that the heating rate and sintering temperature in the sintering step were changed. They were similarly evaluated.
The results are shown in Table 5.

As seen from the above, the invention ensures that a transparent body is synthesized from a secondary sintered body having a crystal grain size of up to 2 μm, even when the heating rate and sintering temperature in the sintering step are changed within the predetermined range. The diffuse transmittance at wavelength 633 nm is suppressed as low as 1% and the insertion loss is reduced to 1.02 dB or below. The sample also shows an overall light transmittance of at least 80.0% and a diffuse transmittance of up to 1.2% at wavelength 633 nm, and an overall light transmittance of at least 80.4% and a diffuse transmittance of up to 0.5% at wavelength 1,064 nm. According to the invention, a transparent ceramic material functioning as a magneto-optical part over a broad range from visible to NIR is manufactured.

Example 4

Examples 4-1 to 4-3 and Comparative Examples 4-1, 4-2

Secondary sintered body samples were manufactured under the same conditions as in Example 1-1 except that the temperature T1 in the sintering step was changed in the range of 1,000° C. to 1,500° C. They were similarly evaluated.

TABLE 5

| | | | Example | | | |
|---|---|---|---|---|---|---|
| | | | 3-1 | 3-2 | 3-3 | 3-4 |
| Raw material | Terbium oxide | Molar ratio (%) | 50 | 50 | 50 | 50 |
| | Rare earth oxide | Type | Y$_2$O$_3$ | Y$_2$O$_3$ | Y$_2$O$_3$ | Y$_2$O$_3$ |
| | | Molar ratio (%) | 50 | 50 | 50 | 50 |
| | Sintering aid | Type | HfO$_2$ | HfO$_2$ | HfO$_2$ | HfO$_2$ |
| | | Content (wt %) | 1 | 1 | 1 | 1 |
| Steps | Source powder preparation | | 3-component co-precipitation | | | |
| | Sintering | Sintering temperature T (° C.) | 1,400 | 1,300 | 1,500 | 1,600 |
| | | Temperature T1 (° C.) | 1,300 | 1,300 | 1,300 | 1,300 |
| | | Heating rate up to T1 (° C./h) | 200 | 300 | 200 | 200 |
| | | subsequent to T1 | 20 | — | 20 | 20 |
| | | Time (hr) | 2 | 2 | 2 | 2 |
| | | Atmosphere | vacuum | vacuum | vacuum | vacuum |
| | HIP | Temperature (° C.) | 1,600 | 1,600 | 1,600 | 1,600 |
| | | Heating rate (° C./h) | 300 | 300 | 300 | 300 |
| | | Time (hr) | 3 | 3 | 3 | 3 |
| | | Pressure (MPa) | 198 | 198 | 198 | 198 |
| Evaluation results | Relative density (%) of primary sintered body | | 95.3 | 96.2 | 96.8 | 97.6 |
| | Average grain size (μm) of secondary sintered body | | 1.6 | 1.6 | 1.6 | 1.6 |
| | Overall light transmittance (%) | @ 633 nm | 80.09 | 80.29 | 80.07 | 80.29 |
| | | @ 1,064 nm | 80.77 | 80.78 | 80.59 | 80.43 |
| | Diffuse transmittance (%) | @ 633 nm | 1.02 | 1.04 | 1.00 | 1.12 |
| | | @ 1,064 nm | 0.42 | 0.43 | 0.42 | 0.45 |
| | Insertion loss (dB) | @ 633 nm | 1.02 | 1.01 | 1.02 | 1.02 |
| | | @ 1,064 nm | 0.95 | 0.95 | 0.96 | 0.97 |

The results are shown in Table 6.

TABLE 6

|  |  |  | Comparative Example | | Example | | |
|---|---|---|---|---|---|---|---|
|  |  |  | 4-1 | 4-2 | 4-1 | 4-2 | 4-3 |
| Raw material | Terbium oxide | Molar ratio (%) | 50 | 50 | 50 | 50 | 50 |
|  | Rare earth oxide | Type | $Y_2O_3$ | $Y_2O_3$ | $Y_2O_3$ | $Y_2O_3$ | $Y_2O_3$ |
|  |  | Molar ratio (%) | 50 | 50 | 50 | 50 | 50 |
|  | Sintering aid | Type | $ZrO_2$ | $ZrO_2$ | $ZrO_2$ | $ZrO_2$ | $ZrO_2$ |
|  |  | Content (wt %) | 0.5 | 0.5 | 0.5 | 0.5 | 0.5 |
| Steps | Source powder preparation | | 3-component co-precipitation | | | | |
|  | Sintering | Sintering temperature T (° C.) | 1,500 | 1,500 | 1,500 | 1,500 | 1,500 |
|  |  | Temperature T1 (° C.) | 1,000 | 1,100 | 1,200 | 1,400 | 1,500 |
|  |  | Heating rate (° C./h) up to T1 | 100 | 100 | 100 | 100 | 100 |
|  |  | subsequent to T1 | 20 | 20 | 20 | 20 | — |
|  |  | Time (hr) | 2 | 2 | 2 | 2 | 2 |
|  |  | Atmosphere | vacuum | vacuum | vacuum | vacuum | vacuum |
|  | HIP | Temperature (° C.) | 1,500 | 1,500 | 1,500 | 1,500 | 1,500 |
|  |  | Heating rate (° C./h) | 300 | 300 | 300 | 300 | 300 |
|  |  | Time (hr) | 3 | 3 | 3 | 3 | 3 |
|  |  | Pressure (MPa) | 198 | 198 | 198 | 198 | 198 |
| Evaluation results | Relative density (%) of primary sintered body | | 90.5 | 92.6 | 94.4 | 97.2 | 98.2 |
|  | Average grain size (μm) of secondary sintered body | | 1.4 | 1.4 | 1.4 | 1.4 | 1.7 |
|  | Overall light transmittance (%) | @ 633 nm | devitrified | devitrified | 80.16 | 80.39 | 80.08 |
|  |  | @ 1,064 nm | devitrified | devitrified | 80.44 | 80.45 | 80.25 |
|  | Diffuse transmittance (%) | @ 633 nm | devitrified | devitrified | 1.09 | 1.14 | 1.56 |
|  |  | @ 1,064 nm | devitrified | devitrified | 0.46 | 0.47 | 0.62 |
|  | Insertion loss (dB) | @ 633 nm | devitrified | devitrified | 1.02 | 1.01 | 1.05 |
|  |  | @ 1,064 nm | devitrified | devitrified | 0.97 | 0.97 | 0.99 |

As seen from the above, when the temperature T1 at which the heating rate during the sintering step is maintained high (100° C./h) is lower than 1,200° C., the primary sintered body has a low relative density and devitrifies. When the temperature T1 at which the heating rate is maintained high (100° C./h) is at least 1,200° C., the primary sintered body is consolidated to a high density and transparentized. The sintered body shows an overall light transmittance of at least 80.0% and a diffuse transmittance of up to 1.6% at wavelength 633 nm, and an overall light transmittance of at least 80.2% and a diffuse transmittance of up to 0.7% at wavelength 1,064 nm. When the temperature T1 was 1,500° C. (Example 4-3), the diffuse transmittances at wavelength 633 nm and 1,064 nm marked slight increases over those when the temperature T1 is 1,200° C. or 1,400° C.
(Examples 4-1 and 4-2).

Example 5

Examples 5-1 to 5-6

Secondary sintered body samples were manufactured under the same conditions as in Example 1-1 except that the temperature T1 in the sintering step and/or the heating rate subsequent to temperature T1 was changed. They were similarly evaluated. It is noted that in Example 5-4, the heating rate subsequent to temperature T1 was 50° C./h in a range from 1,300° C. to 1,400° C., 10° C./h in a range from more than 1,400° C. to 1,450° C., and 20° C./h in a range from more than 1,450° C. to 1,500° C. This heating rate is designated "zigzag" in Table 7.

The results are shown in Table 7.

TABLE 7

|  |  |  | Example | | | | | |
|---|---|---|---|---|---|---|---|---|
|  |  |  | 5-1 | 5-2 | 5-3 | 5-4 | 5-5 | 5-6 |
| Raw material | Terbium oxide | Molar ratio (%) | 50 | 50 | 50 | 50 | 50 | 50 |
|  | Rare earth oxide | Type | $Y_2O_3$ | $Y_2O_3$ | $Y_2O_3$ | $Y_2O_3$ | $Y_2O_3$ | $Y_2O_3$ |
|  |  | Molar ratio (%) | 50 | 50 | 50 | 50 | 50 | 50 |
|  | Sintering aid | Type | $ZrO_2$ | $ZrO_2$ | $ZrO_2$ | $ZrO_2$ | $ZrO_2$ | $ZrO_2$ |
|  |  | Content (wt %) | 0.5 | 0.5 | 0.5 | 0.5 | 0.5 | 0.5 |
| Steps | Source powder preparation | | 3-component co-precipitation | | | | | |
|  | Sintering | Sintering temperature T (° C.) | 1,500 | 1,500 | 1,500 | 1,500 | 1,500 | 1,500 |
|  |  | Temperature T1 (° C.) | 1,300 | 1,300 | 1,300 | 1,300 | 1,400 | 1,400 |
|  |  | Heating rate (° C./h) up to T1 | 100 | 100 | 100 | 100 | 100 | 100 |
|  |  | subsequent to T1 | 50 | 30 | 10 | zigzag | 50 | 10 |
|  |  | Time (hr) | 2 | 2 | 2 | 2 | 2 | 2 |
|  |  | Atmosphere | vacuum | vacuum | vacuum | vacuum | vacuum | vacuum |
|  | HIP | Temperature (° C.) | 1,500 | 1,500 | 1,500 | 1,500 | 1,500 | 1,500 |
|  |  | Heating rate (° C./h) | 300 | 300 | 300 | 300 | 300 | 300 |
|  |  | Time (hr) | 3 | 3 | 3 | 3 | 3 | 3 |
|  |  | Pressure (MPa) | 198 | 198 | 198 | 198 | 198 | 198 |

TABLE 7-continued

| | | | Example | | | | | |
|---|---|---|---|---|---|---|---|---|
| | | | 5-1 | 5-2 | 5-3 | 5-4 | 5-5 | 5-6 |
| Evaluation results | Relative density (%) of primary sintered body | | 96.7 | 96.1 | 94.9 | 96.3 | 95.4 | 95.1 |
| | Average grain size (μm) of secondary sintered body | | 1.4 | 1.4 | 1.1 | 1.2 | 1.4 | 1.2 |
| | Overall light transmittance (%) | @ 633 nm | 80.24 | 80.15 | 80.29 | 80.14 | 80.21 | 80.28 |
| | | @ 1,064 nm | 80.31 | 80.38 | 80.34 | 80.39 | 80.30 | 80.41 |
| | Diffuse transmittance (%) | @ 633 nm | 1.17 | 1.08 | 1.04 | 1.02 | 1.14 | 1.05 |
| | | @ 1,064 nm | 0.47 | 0.48 | 0.44 | 0.41 | 0.48 | 0.43 |
| | Insertion loss (dB) | @ 633 nm | 1.02 | 1.02 | 1.01 | 0.99 | 1.02 | 1.00 |
| | | @ 1,064 nm | 0.99 | 0.98 | 0.98 | 0.97 | 0.99 | 0.97 |

As seen from the above, when the heating rate subsequent to temperature T1 during the sintering step is lower than 100° C./h, specifically 10-50° C./h, a transparent ceramic material having an insertion loss of up to 1.02 dB at wavelength 633 nm and high transparency and functioning as a magneto-optical part over a broad range from visible to NIR is manufactured. As seen from Example 5-4, even when the heating rate subsequent to temperature T1 is switched plural times in the heating step within the range of 10° C./h to 50° C./h, the insertion loss at wavelength 633 nm is up to 1.02 dB. The ceramic material shows an overall light transmittance of at least 80.1% and a diffuse transmittance of up to 1.2% at wavelength 633 nm, and an overall light transmittance of at least 80.3% and a diffuse transmittance of up to 0.5% at wavelength 1,064 nm. According to the invention, a transparent ceramic material having high transparency and functioning as a magneto-optical part over a broad range from visible to NIR is manufactured.

Japanese Patent Application No. 2018-043076 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A transparent ceramic material in the form of a complex oxide sintered body represented by the formula (I):

$$(Tb_xR_{1-x})_2O_3 \quad (I)$$

wherein x is a number: 0.4≤x<1.0, and R is at least one rare earth element selected from yttrium, scandium, and lanthanoid elements, exclusive of terbium, the sintered body having a crystal grain size of from 0.5 μm to 2 μm, wherein a specimen of 11 mm long made from the sintered body has an overall light transmittance of at least 80.0% and a diffuse transmittance of up to 1.6% at wavelength 633 nm, and wherein the transparent ceramic material is manufactured by a method comprising the steps of:

molding a source powder into a compact, the source powder comprising a rare earth oxide consisting of terbium oxide and at least one other rare earth oxide selected from yttrium oxide, scandium oxide, and oxides of lanthanoid elements, exclusive of terbium, in a molar fraction of at least 40 mol % terbium oxide and the balance of the other rare earth oxide as a main component, and an oxide of at least one element selected from Group 2 elements and Group 4 elements as a sintering aid, wherein the source powder is obtained by furnishing an aqueous solution containing (a) terbium ions, (b) ions of the at least one rare earth element for said at least one other rare earth oxide, and (c) ions of said at least one element selected from Group 2 elements and Group 4 elements, letting components (a), (b) and (c) co-precipitate from the solution, filtering and heat drying the co-precipitate;

sintering the compact at a sintering temperature T wherein 1,300° C.≤T≤1,650° C., wherein in the heating course to the sintering temperature T the sintering step includes heating from room temperature to a predetermined temperature T1, where 1200° C.≤T1≤T at a heating rate of at least 100° C./h, and optionally heating from the temperature T1 at a rate of from 1° C./h to 95° C./h, hot isostatic pressing (HIP) the sintered compact at 1,300° C. to 1,650° C.

2. The ceramic material of claim 1, wherein the specimen of 11 mm long has an overall light transmittance of at least 80.2% and a diffuse transmittance of up to 0.7% at wavelength 1,064 nm.

3. A magneto-optical device comprising a magneto-optical part using the transparent ceramic material of claim 1.

4. The ceramic material of claim 1, wherein the sintering aid is zirconium oxide and/or hafnium oxide.

5. The ceramic material of claim 1, wherein the sintering aid is added in an amount of 0.1% to 3% by weight, based on the total weight of the complex oxide.

6. The ceramic material of claim 1, wherein the other rare earth oxide is yttrium oxide.

* * * * *